United States Patent [19]

Foley et al.

[11] Patent Number: 5,792,572
[45] Date of Patent: Aug. 11, 1998

[54] SYSTEM FOR TREATMENT OF ACID FUEL CELL FUEL GAS STREAM

[75] Inventors: Peter F. Foley, Manchester; Francis J. Luczak, Glastonbury; John L. Preston, Jr., Hebron; Christopher R. Teeling, Enfield, all of Conn.; Richard D. Breault, North Kingston, R.I.; Robert R. Fredley; Glenn W. Scheffler, both of Tolland, Conn.

[73] Assignee: International Fuel Cells, Inc., So. Windsor, Conn.

[21] Appl. No.: 656,569

[22] Filed: May 31, 1996

[51] Int. Cl.⁶ ........................................ H01M 8/06
[52] U.S. Cl. ................. 429/20; 429/17; 423/237; 423/238
[58] Field of Search ........................ 423/237, 238; 429/17, 20

[56] References Cited

U.S. PATENT DOCUMENTS 4,259,302  3/1981  Katz et al. .
5,213,912  5/1993  Kunz et al. ........................ 429/17 X
5,419,978  5/1995  Landau ........................... 429/17 X Primary Examiner—John S. Maples
Attorney, Agent, or Firm—William W. Jones

[57] ABSTRACT

Ammonia which is found in fuel cell fuel gases is removed therefrom by passing the fuel gas stream through a scrubber bed of porous carbon pellets containing phosphoric acid. The ammonia reacts with the phosphoric acid in the scrubber bed to form ammonium phosphate compounds which remain in the scrubber bed. The ammonia content of the fuel gas stream is thus lowered to a concentration of about one ppm or less. By maintaining the temperature of the fuel gas stream passing through the scrubber bed in a range of about 400° F. to about 450° F. sufficient phosphoric acid will also be evaporated from the scrubber bed to replace acid electrolyte lost during operation of the power plant. Adjustments in the temperature of the fuel gas flowing through the scrubber may be made in order to match electrolyte losses which occur during different operating phases of the power plant. The scrubber formed in accordance with this invention thus serves two functions, one being to remove ammonia from the fuel gas stream, and the other being to replenish electrolyte lost in the power plant during normal operation thereof.

6 Claims, 1 Drawing Sheet

SYSTEM FOR TREATMENT OF ACID FUEL CELL FUEL GAS STREAM

TECHNICAL FIELD

This invention relates to the treatment of a fuel gas stream in a phosphoric acid fuel cell power plant. More particularly, this invention relates to the removal of ammonia from the fuel gas stream while concurrently adding acid electrolyte to the fuel gas stream by passing the fuel gas stream through an acid-impregnated scrubber bed.

BACKGROUND ART

One problem which exists in connection with the operation of acid fuel cell power plants relates to electrolyte loss due to electrolyte evaporation into reactant gas streams when the power plant cell stack assembly is operated at temperatures of over 300° F. This problem is identified in U.S. Pat. No. 4,004,947, granted Jan. 25, 1977 to D. B. Bloomfield. The solution to this problem which is provided in the aforesaid patent is to pressurize the gas streams in the power plant, so as to decrease the amount of acid which will evaporate into the reactant gas streams. U.S. Pat. Nos. 4,596,748 granted Jun. 24, 1986 to M. Katz et al; 4,596,749 granted Jun. 24, 1986 to J. V. Congdon et al; and 4,612,262 granted Sep. 16, 1986 to P. E. Grevstad also recognize the problem of loss of electrolyte from acid fuel cells during operation thereof. The latter three patents solve the problem by adding acid to the fuel cell power plant to replenish the electrolyte lost to evaporation. The '748 patent suggests that acid be sprayed into the fuel gas stream and thus carried into the active area of the power plant. The '749 patent suggests that acid be absorbed into tabs on outer faces of the power plant stack and evaporated from the tabs into reactant gases entering the stack. The '262 patent suggests that acid be deposited onto an external vertical face of the fuel cell stack wherefrom it will be absorbed by capillary action into the active area of the stack. The aforesaid patents all recognize the problem of electrolyte loss from an acid fuel cell power plant and suggest various solutions to this problem.

Another problem which exists in acid fuel cell power plants relates the presence of ammonia in the fuel gas flowing into the active area of the plant. U.S. Pat. No. 4,259,302 granted Mar. 31, 1981 to M. Katz, et al., discusses the problems caused in phosphoric acid fuel cell power plants by the presence of ammonia in the fuel gas stream for the power plant. Ammonia will be formed in the fuel gas reformer in the power plant, and it will be formed in concentrations which can adversely affect the power plant in cases where the gas being used to fuel the power plant contains significant amounts of nitrogen. If ammonia is present in the fuel gas stream in amounts in excess of about 1 ppm, and is allowed to enter the active area of the power plant cell stack assembly, it will cause decay in power plant performance by reacting with the phosphoric acid to form dihydrogen ammonium phosphate or related compounds which interfere with the electrochemical reaction, and which also consumes the phosphoric acid electrolyte. The above-noted patent deals with the ammonia problem by passing the processed fuel gas stream through scrubber beds of carbon pellets which are soaked with phosphoric acid. The patent recognizes that the amount of acid contained in the scrubber beds will be depleted by reacting with the ammonia in the processed gas, and, therefore, suggests that parallel scrubber beds be used in the system. One of the beds will be used to remove ammonia from the processed fuel gas while the other bed will be regenerated with oxygen to convert the dihydrogen ammonium phosphate back to phosphoric acid and creating an effluent of nitrogen gas and air. Each bed is periodically regenerated, so that while one bed is being used to scrub the incoming gas stream, the other bed is being regenerated. Both of the ammonia scrubbing beds are operated at a temperature of about 380° F., both when scrubbing and when regenerating.

The aforesaid patents recognize the need to remove ammonia from an acid fuel cell fuel power plant gas stream; and also the need to deal with acid electrolyte loss from the active area of the power plant. It would be desirable to provide a single mechanism for dealing with both of the aforesaid problems.

DISCLOSURE OF THE INVENTION

This invention relates to an ammonia scrubber and acid electrolyte replenishment system which provides for removal of ammonia from fuel cell fuel gas and also adds electrolyte to the fuel gas in amounts sufficient to replace electrolyte lost from the active area of the fuel cell stack assembly during operation of the cell stack assembly. The scrubber bed is preferably formed from porous carbon pellets which are impregnated with phosphoric acid. The scrubber system includes a heat exchanger-precooler through which the processed fuel gas passes prior to its entering the scrubber bed. The precooler is operable to lower the temperature of the processed fuel gas stream to a temperature in the range of about 400° F. to about 450° F. The process fuel gas stream entering the scrubber bed thus has a temperature of between 400° F. to 450° F., a temperature which optimizes the vapor pressure of the $H_3PO_4$ in the scrubber bed, so as to optimize the amount of $H_3PO_4$ evaporated into the fuel gas stream, since vapor pressure of the acid electrolyte is a function of temperature. By cooling the fuel gas in this manner, the amount of acid evaporated from the scrubber bed into the fuel gas stream can be kept at a level which is essentially equal to the level of acid electrolyte evaporated from the active area of the fuel cell stack in the power plant. This being the case, there will be no or essentially no net acid electrolyte loss from the fuel cell stack assembly active area of the power plant. Phosphoric acid in the scrubber bed which is evaporated into the fuel gas stream is replaced by adding acid to the scrubber bed. By operating the scrubber bed at the aforesaid temperatures, and by adding acid to the scrubber bed as needed, ammonia will be removed from the fuel gas stream in the same manner as the prior art. At the same time, electrolyte will be added to the active area of the power plant cell stack assembly in quantities which are greater than the amounts added by a scrubber bed which is operated at the 380° F. temperatures required in the U.S. Pat. No. 4,259,302. Approximately one third to one half of the acid would be added to the cell stack assembly active area if the scrubber bed were operated at the prior art 380° F. temperature, as compared to the scrubber bed being operated in the 400° to 450° F. operating range of this invention. By sensing the temperature of effluent gases expelled from the active area of the fuel cell stack assembly which will provide an indication of the amount of electrolyte being lost from the cell stack assembly active area of the power plant, one can adjust the operating temperature of the scrubber bed so as to provide an optimum amount of acid which is evaporated into the incoming fuel gas stream in the scrubber bed.

It is therefore an object of this invention to provide a fuel gas ammonia scrubbing system for a fuel cell power plant which scrubbing system possesses the ability to remove ammonia from a fuel cell fuel gas stream, while at the same time replenishing acid electrolyte lost during operation of the power plant.

It is an additional object of this invention to provide an ammonia scrubbing system of the character described which is operated at temperature ranges that cause an appropriate amount of acid electrolyte to be evaporated into the incoming fuel gas stream.

These and other objects and advantages of the invention will become more readily apparent from the following detailed description of a preferred embodiment of the invention when taken in conjunction with the accompanying drawings, in which:

BEST MODE FOR CARRYING OUT THE INVENTION

Figure 1:
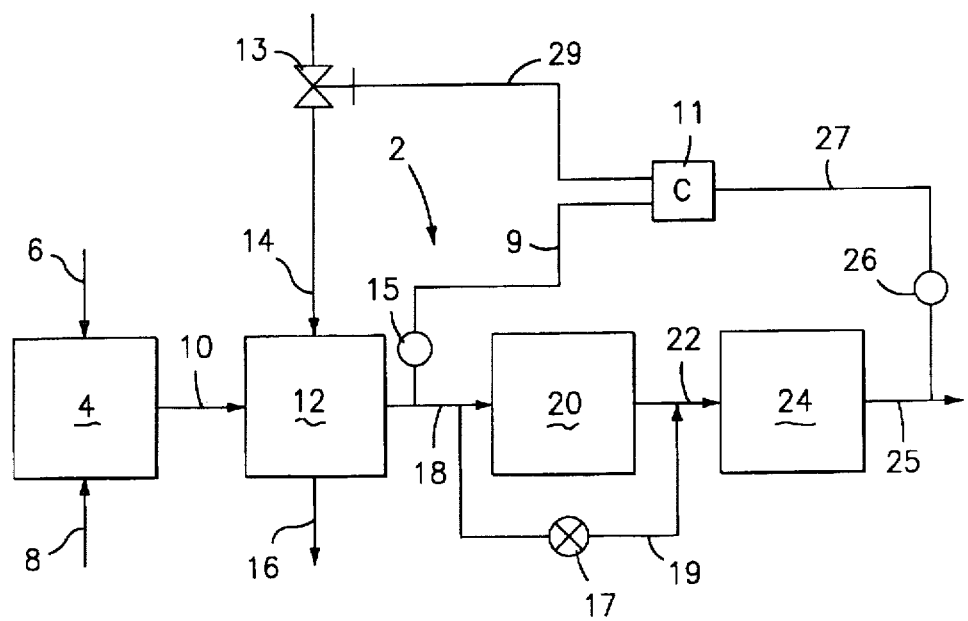
FIG. 1 is a schematic view of a fuel cell power plant employing the ammonia scrubbing and acid electrolyte replenishment system of this invention.

Referring to the drawings, there is shown in FIG. 1 a schematic representation of a fuel cell power plant, denoted generally by the numeral 2, which employs the fuel gas ammonia scrubbing and acid electrolyte replenishment system of this invention. The power plant 2 includes a fuel gas reformer 4 which receives raw fuel gas, such as natural gas, landfill gas, or the like, via fuel gas line 6. The reformer 4 also receives steam from line 8. Processed fuel gas flows through line 10 to a fuel gas cooler 12 wherein the processed fuel gas is cooled to a temperature in the range of about 400° F. to about 450° F. The amount of coolant flowing through the cooler 12 may be varied by a variable valve 13. The cooler 12 is a heat exchanger, and the heat exchange coolant flows through the cooler 12 via lines 14 and 16. The cooled processed fuel gas flows from the cooler 12 through line 18 to the ammonia scrubber bed 20. The ammonia-scrubbed and electrolyte-enhanced fuel gas stream flows from the scrubber bed 20 through line 22 into the fuel cell stack assembly active area 24 of the power plant. Gases leaving the cell stack assembly active area of the power plant 2 exit via passage 25.

In certain cases it may be desirable to provide a by-pass line 19 for by-passing a portion of the fuel gas around the scrubber bed 20. The purpose of the by-pass line 19 is to lower the partial pressure of $H_3PO_4$ in the gas stream line 22 such that the dew point of the acid is lower than the temperature of the gas stream line 22. This minimizes the likelihood that acid will condense out in the gas stream line 22, or in a fuel cell inlet manifold. The by-pass line 19 can be provided with a variable flow control valve 17 to vary the amount of fuel gas passing through the by-pass line 19, and thus through the scrubber bed 20.

The cooler outlet line 18 may be provided with a temperature sensor 15 which senses the temperature of the reactant gas stream exiting the cooler 12, and which is connected to a power plant controller 11 via line 9. The power plant reactant gases leaving the cell stack assembly active area 24 of the power plant 2 have their temperature sensed by a sensor 26 in line 25. The sensor 26 is connected to the controller 11 by line 27. Based on temperature signals received by the plant controller 11 from the exit gas temperature sensor 26, the controller 11 can adjust the valve 13 via signal line 29 to increase or decrease the rate of coolant flow through the cooler 12 and thereby adjust the temperature of fuel gas entering the scrubber 20. The objective of monitoring and adjusting the temperature of the gas stream leaving the cell stack assembly 24 of the power plant and the temperature of the gas stream entering the scrubber bed 20 is to provide temperatures at both monitored locations which will provide an amount of electrolyte evaporated into the entering gas stream from the scrubber bed 20 which will essentially equal the amount of electrolyte carried out of the cell stack assembly active area 24 of the power plant by the reactant gases.

Figure 2:
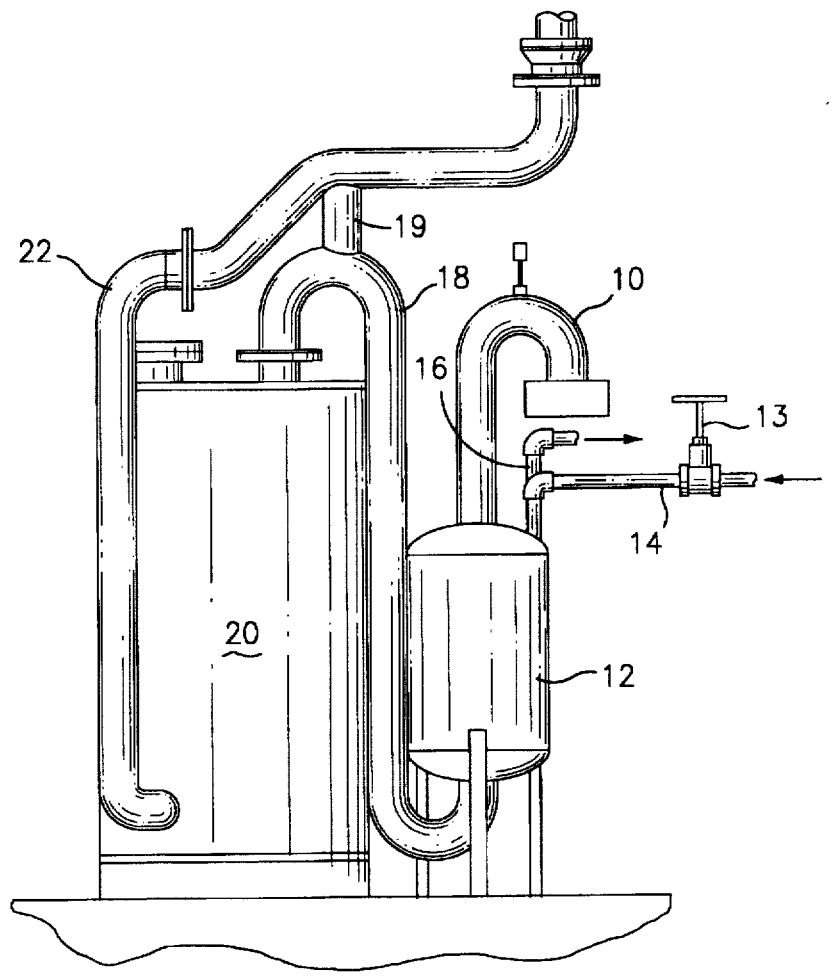
FIG. 2 is an elevational view of the ammonia scrubbing and acid electrolyte replenishment station in the power plant of FIG. 1.

FIG. 2 shows a preferred configuration of the fuel gas cooler-scrubber portion of the power plant. It will be noted that the cooler 12 may take the form of a tank, and the reformer gas line 10 can enter the tank 12 at its upper end and flows downwardly through the tank 12 to the outlet line 18. The cooled fuel gas enters the ammonia scrubber tank 20 preferably through its upper end and flows downwardly through the acid-impregnated carbon pellets in the tank 20 to the outlet line 22. The scrubbed reformer gas then flows into the fuel gas inlet manifold on a fuel cell stack assembly (not shown) in the power plant. As previously noted, the temperature of the cooler 12 can be controlled by means of an adjustable valve 13 which can vary the rate of flow of coolant through the coolant inlet line 14. Acid can be added to the bed 20 by dripping, spraying or otherwise adding acid thereto, either continuously or intermittently. Alternatively, the bed 20 could be removed and replaced periodically during normal shutdown maintenance of the power plant.

It will be appreciated that the ammonia scrubber and electrolyte replenishment system of this invention provides a single station in a fuel cell power plant that performs two separate functions at the same time. The system of this invention is simple and compact; can be operated at appropriate temperatures; and can also be retrofitted into existing fuel cell power plants.

Since many changes and variations of the disclosed embodiment of the invention may be made without departing from the inventive concept, it is not intended to limit the invention other than as required by the appended claims.

What is claimed is:

1. A system for treating a processed fuel cell power plant fuel gas stream, said system comprising:
   a) reformer means for forming a processed fuel gas stream;
   b) scrubbing means for forming an ammonia scrubber which contains phosphoric acid;
   c) cooler means for lowering the temperature of the processed fuel gas stream to a temperature above about 400° F.; and
   d) means for directing the processed fuel gas stream from said reformer means through said cooler means, and thence through said scrubbing means.

2. The system of claim 1 wherein said cooler means is operable to lower the temperature of said processed gas stream to a temperature in the range of about 400° F. to about 450° F.

3. The system of claim 1 wherein said scrubbing means is operable to lower the concentration of ammonia in the gas stream to a concentration of about 1 ppm or less, and the cooler means is operable to lower the temperature of the processed gas stream to a temperature which results in removal of sufficient phosphoric acid from said scrubbing means to replenish essentially all phosphoric acid electrolyte lost from a fuel cell stack assembly active area of the power plant during operation thereof.

4. The system of claim 3 comprising means for sensing the temperature of exit gases leaving the fuel cell stack assembly active area of the power plant; and means for adjusting the temperature in said cooling means in response to changes in the sensed temperature of said exit gases.

5. A system for treating a processed fuel cell power plant fuel gas stream, said system comprising:
   a) reformer means for forming a processed fuel gas stream;
   b) scrubbing means for forming an ammonia scrubber which contains phosphoric acid;
   c) cooler means for lowering the temperature of the processed fuel gas stream to a temperature above about 400° F.;
   d) means for directing the processed fuel gas stream from said reformer means through said cooler means, and thence through said scrubbing means; and
   e) by-pass means for diverting a portion of the fuel gas stream around said scrubber so as to lower the partial pressure of phosphoric acid in the fuel gas stream to an extent which will provide a phosphoric acid due point which is lower than the temperature of the fuel gas stream so as to minimize condensation of phosphoric acid from said fuel gas stream.

6. The system of claim 5 further including a flow control valve for varying the amount of fuel gas flowing through said by-pass means.

* * * * *